United States Patent Office 2,721,848
Patented Oct. 25, 1955

2,721,848

PAINT REMOVING PROCESS AND COMPOSITION

Emil A. Vitalis, Springdale, Conn., assignor to American Cyanamid Company, New York, N. Y., a corporation of Maine No Drawing. Application September 25, 1951,
Serial No. 248,265

8 Claims. (Cl. 252—153)

This invention relates to an improved method and composition for removing dried paint or encrusted paint deposits. The invention includes the application of a novel class of softening or resolubilizing agents to paint in order to assist in its removal. The invention in its broader aspects also includes as paint removers certain new compositions made up of solutions in volatile organic solvents of salts of N-aliphatic carbamic acid, as will hereinafter be more fully described.

The process of the invention may be applied in removing paint from such substrates as wood, sheet metal, brick, plaster and the like, where it is desired to replace an old coat of paint with a new one. The invention is of particular advantage, however, in removing dried or encrusted paint deposits from textiles, such as wool, cotton, rayon and nylon fabrics, nettings and the like and in cleaning paint brushes. It can also be used in cleaning rollers, sprayers and other paint applicators. When used for these purposes the new paint removing compositions function as rapid softening or resolubilizing agents for dried paint but have no damaging effect on the textiles or on the bristles of paint brushes.

The compositions applied for the softening of dried paints in accordance with the invention contain as a principal active ingredient an ethylated or ethylene oxide-reacted aliphatic guanidinium N-aliphatic carbamate in which the aliphatic radicals contain at least 4 carbon atoms. This class of materials is an excellent softening agent for dried paints; however, for quicker paint removal, the carbamate should be applied as a solution in a volatile solvent. Although water and lower aliphatic alcohol such as methanol or ethanol are suitable, better results have been obtained with volatile hydrocarbon solvents; i. e., with liquid hydrocarbons boiling below about 450°–500° F.

An even better and more complete paint removal is obtained, in accordance with a preferred feature of the invention, when the ethylated aliphatic guanidinium N-aliphatic carbamate is used in admixture with an ethylated aliphatic amine salt of the corresponding N-aliphatic carbamic acid. Such a mixture is readily obtained by a slight modification of the procedure for manufacturing aliphatic guanidinium N-aliphatic carbamate salts, as will be subsequently described. In this mixture all of the aliphatic radicals should contain at least 4 and preferably 12 to about 18 carbon atoms.

The substituted carbamic acid salts used in practicing the invention are prepared from aliphatic amines of 4 to about 18 carbon atoms such as n-butylamine, amylamines, n-octylamine, n-dodecylamine, tetradecylamine, hexadecylamine, octadecylamine and the like. Mixtures of these amines can sometimes be employed to advantage; thus, a mixture of aliphatic amines of 16–18 carbon atoms, including a small proportion of n-octadecenylamine, is available commercially in large quantities and may be employed. The amine or amine mixture is preferably suspended in a volatile organic solvent such as ethanol, isopropanol, butanol, acetone, dioxane and the like and saturated with carbon dioxide. This converts the amine into a salt.

Cyanamide is then added to the solution of amine salt and the mixture is reacted to convert a part of the amine into the corresponding alkyl-substituted guanidine. The ratio of cyanamide to amine will determine whether the product consists wholly of aliphatic guanidinium N-aliphatic carbamate or whether a mixture of this material with aliphatic amine salt of N-aliphatic carbamic acid is obtained. If the molar ratio of amine to cyanamide is 2:1 the guanidinium carbamate is obtained; with smaller proportions of cyanamide a mixture is produced. It has been found, as another important feature of the invention, that mixtures containing about 50–70 mol percent of aliphatic guanidinium N-aliphatic carbamate and about 30–50 mol percent of aliphatic amine salt of N-aliphatic carbamic acid possess paint-softening and paint-removing properties to a high degree; the preferred molar ratio is probably about 3:2.

The amounts of ethylene oxide to be combined with the carbamic acid salts to produce the ethylated products will depend largely on the molecular weight of the amine or amine mixture employed. With the lower aliphatic amines, such as butyl amines and amyl amines, the preferred ratio of ethylene oxide to amine is relatively low, being on the order of 1:1 to about 3:1. With amines of increasing molecular weight, correspondingly increased ratios of ethylene oxide should be used. In general, the molar ratio of ethylene oxide to amine should not usually exceed about 25:1, and best results are obtained with proportions of 10:1 and less, even with the higher aliphatic amines such as octadecylamine and the commercial mixtures thereof referred to above. Suitable proportions that have produced ethylated compositions of good paint removing properties are illustrated in the following specific examples.

The ethylation of the guanidinium carbamate or carbamate salt mixtures with ethylene oxide is not difficult. The carbamate salt solutions, prepared as described above, are preferably heated at about 60°–70° C. and the ethylene oxide is introduced as a steady stream. If desired, the absorption can be carried out under elevated pressures up to about 5–10 atmospheres, and this may be advisable in large scale manufacturing processes. Inasmuch as the aliphatic guanidinium N-aliphatic carbamate solutions are alkaline in character, no additional catalyst is necessary, and no difficulty is experienced in obtaining any desired degree of ethylene oxide absorption.

As is noted above, the softening agents of the invention are most advantageously employed as solutions in organic solvents. For most purposes, solutions containing from about 2% to about 50% by weight of the carbamate salt or salt mixture in 50–98% of volatile solvents are employed. Solutions containing about 8–15% by weight of the carbamate salts are preferred. While any volatile organic solvent may be used, hydrocarbons of the type used as thinners for paints and lacquers appear to give best results; such mixtures as turpentine and other pinene fractions, gasoline or kerosene, Stoddard solvent, solvent naphtha, Varsol and other refined petroleum fractions boiling below about 450° F. give particularly good results. Benzene, toluene, xylenes and other similar aromatic hydrocarbons may also be used; however, they are preferably employed in admixture with aliphatic hydrocarbons. Halogenated solvents such as carbon tetrachloride, dichlorethylene and similar materials of the type used as dry cleaning fluids may be employed if desired.

The softening compositions of the invention are effective agents for the removal of all of the common paints, varnishes and enamels such as those typified by interior and exterior house paints having drying oil vehicles of bodied or unbodied linseed oil, soya bean oil, Chinawood oil and the like. Lacquers having drying vehicles containing vinyl resins, alkyd resins and the like are softened by the compositions of the invention as are kettle bodied drying oil base varnishes containing ester gums and the like. Any suitable method of application of the softening composition may be used; thus, for example, the paint remover may be sprayed or brushed onto a painted surface or applied to spotted textiles with a cloth. Usually the painted or paint-spotted substrate is allowed to stand for from 30 minutes to 2 hours after the paint-removing solution is applied, after which it can be rubbed or scraped to remove the loosened paint. Thereafter a second application of the paint remover solution is made and the process is repeated until the desired degree of paint removal is obtained.

In removing paint spots from wool, cotton and other fabrics, dry cleaning techniques are preferabdy employed. The paint spots are brushed or otherwise coated with the paint remover solution and allowed to stand to permit softening. They may then be scraped, rubbed or brushed. Subsequent applications of the remover are made in the same manner. When the paint has been thoroughly loosened the fabric may be washed in warm water or in dry cleaning solvents to effect complete removal.

The invention will be further illustrated by the following specific examples. It will be understood, however, that although these examples may describe in detail some of the specific features of the invention, they are given primarily for purposes of illustration, and variations and substitutions of equivalents may be resorted to within the scope of the appended claims.

Example 1

An ethylated octadecylguanidinium N-octadecylcarbamate was prepared from a solution obtained by dissolving 83 parts by weight of a commercial grade of octadecylamine in 61 parts of 92% ethyl alcohol and introducing carbon dioxide for approximately 1 hour. The temperature was then raised to 80° C. and the solution was stirred as 19 parts of cyanamide were added slowly as a 25% aqueous solution. Carbon dioxide was also introduced during this time and for an additional one hour.

The batch was placed in a pressure vessel and maintained at 70° C. while ethylene oxide was introduced at such a rate that the pressure was below 5 atmospheres. After a total of 75 parts had been reacted the product was concentrated by distillation to 70% solids. It contained about 6–8 mols of ethylene oxide for each mol of combined octadecylamine; the volatiles were about half water and half ethanol.

A 10 gram portion of the product was dissolved in 90 grams of turpentine and the solution was tested by the following procedure. Cotton cloth was spotted by applying, at intervals, drops of a zinc oxide-cadmium sulfide pigment paint having a drying oil vehicle. The paint spots were allowed to dry and harden in air for three days, after which 10 cc. of the solution under test was applied and the fabric was rubbed occasionally during 2 hours to loosen the softened paint. After applying a second 10 cc. portion and again rubbing the fabric was rinsed in warm water.

The softening action of the aliphatic carbamic acid salt on the dry paint film was apparent. On the first application the surface of the film was softened, and after applying the second portion the paint was completely penetrated and could easily be removed by rinsing.

Example 2

An ethylated mixture of aliphatic amine and aliphatic-substituted guanidine salts of N-aliphatic carbamic acids was prepared by the procedure described in Example 1. A solution of 270 parts by weight (1 mol) of octadecylamine in 200 parts of ethyl alcohol was saturated with carbon dioxide, heated to 80° C. and 12.6 parts (0.3 mol) of cyanamide were introduced slowly and with good agitation while maintaining a steady carbon dioxide supply. The resulting product was reacted with from 5 to 6 mols of ethylene oxide for each mol of amine and concentrated to 70% solids. This mixture contains 2 mols of alkylamine salt of N-alkylcarbamic acid for each 3 mols of alkylguanidinium N-alkylcarbamate and is a preferred composition for softening and removing dried paints, varnishes and lacquers in accordance with the present invention.

Example 3

A composition for cleaning paint brushes was prepared by the following formulation, in which the parts are by weight.

| | Parts |
|---|---|
| Product of Example 2 | 10 |
| Varsol No. 2 | 40 |
| Xylene | 45 |
| Butanol | 5 |

Paint brushes encrusted with dried and hardened house paint were soaked in portions of this composition. The cleaning action was very rapid; after being wetted out by the composition the paint was removed easily, leaving the brushes suitable for reuse.

"Varsol No. 2" is a hydrocarbon mixture that is now in wide commercial use as a lacquer thinner. It has a boiling range of 324°–400° F.; a specific gravity of 0.8; a flash point of 109° F.; a Kauri butanol value of 43 and contains about 35% paraffins, 35% naphthenes and 30% aromatics.

Example 4

Dry cleaning compositions for removing paints, varnishes and the like from cotton and wool cloth were made up as follows, the parts being by weight.

No. 1:
| | Parts |
|---|---|
| Product of Example 2 | 10 |
| Varsol No. 2 | 55 |
| Xylene | 30 |
| Ethanol | 5 |

No. 2:
| | |
|---|---|
| Product of Example 2 | 10 |
| Turpentine | 90 |

No. 3:
| | |
|---|---|
| Product of Example 2 | 20 |
| 95% ethanol | 80 |

No. 4:
| | |
|---|---|
| Product of Example 2 | 50 |
| Water | 50 |

Each of these was applied to cotton and wool fabrics spotted with dried paint by the procedure described in Example 1. In all cases the paint film was softened and at least partially removed. Samples Nos. 1 and 2 removed the paint completely from both wool and cotton after two applications. Samples Nos. 3 and 4 were effective on wool, but the paint removal from cotton was only partial and one or more additional applications were necessary for complete removal.

Example 5

Condensation products of aliphatic guanidinium N-aliphatic carbamates and mixtures thereof with alkylamine N-alkylcarbamates containing 1–25 mols of combined ethylene oxide for each mol of aliphatic amine of 4–18 carbon atoms may be used in practicing the invention. The optimum ratio of combined ethylene oxide is from 1 to about 4 mols per mol of amine when the carbamate salts contain aliphatic radicals of 4–12 carbon atoms; when amines of 12–18 carbon atoms are used the optimum ratio of ethylene oxide is about 3–10 mols per mol of amine. Representative compositions are as follows:

A. A solution of 63 parts (1 mol) of n-butylamine in 200 parts of isopropanol was prepared and saturated with carbon dioxide, 21 parts of cyanamide were added slowly and the mixture was heated with $CO_2$ introduction until guanidine formation was complete. The product was reacted with 44 grams (1 mol) of ethylene oxide and concentrated to 80% solids.

B. A 25% aqueous solution of cyanamide weighing 42 grams was added at 80° C. to a solution of 129 grams of octylamine in 450 cc. of isopropanol that had been saturated with carbon dioxide. The mixture was then ethylated by introducing 176 grams (4 mols) of ethylene oxide while maintaining it at 65–70° C. The resulting solution was concentrated to 75% solids.

C. A solution of 185 grams of dodecylamine in 330 cc. of ethanol was saturated with carbon dioxide and reacted with 10.5 grams of cyanamide dissolved in 50 cc. of water. The resulting mixture of approximately equimolecular quantities of dodecylamine N-dodecylcarbamate and dodecylguanidinium N-dodecylcarbamate was reacted with 264 grams (6 mols) of ethylene oxide.

Each of these condensation products was tested as a paint softener and remover of paint spots on wool and cotton cloth by the procedure described in Example 1. Composition A was most effective as a solution in aqueous ethanol or in isopropanol or butanol. Composition B softened and removed the paint from both wool and cotton after three applications as a 10% solution in a Varsol-benzene mixture; it was also effective in turpentine, in alcoholic solvents and in water. Composition C was even more effective than composition B in the same solvents.

What I claim is:

1. A method of softening dried paint which comprises applying thereto a 2–50% solution in a liquid volatile organic solvent of an ethylene oxide condensation product of an aliphatic guanidinium N-aliphatic carbamate in which the aliphatic radicals contain 4 to 18 carbon atoms, said condensation product containing about 1–25 mols of combined ethylene oxide for each mol of amine combined in said carbamate.

2. A method of softening dried paint which comprises applying thereto a 2–50% solution in a liquid volatile organic solvent of an ethylene oxide condensation product of a mixture of aliphatic amine and aliphatic-substituted guanidine salts of N-aliphatic carbamic acids in which the aliphatic radicals contain 4 to 18 carbon atoms, said condensation product containing about 1–25 mols of combined ethylene oxide for each mol of amine combined in said carbamate mixture.

3. A method of softening dried paint which comprises applying thereto a 2–50% solution in a liquid volatile organic solvent of an ethylene oxide condensation product of a mixture of 50–70 mol percent of an aliphatic-substituted guanidinium N-aliphatic carbamate and 50–30 mol percent of an aliphatic amine N-aliphatic carbamate in which the aliphatic radicals contain about 12 to 18 carbon atoms, said condensation product containing about 3–10 mols of combined ethylene oxide for each mol of amine combined in said carbamate mixture.

4. A method according to claim 3 in which the organic solvent is a volatile hydrocarbon boiling below about 500° F.

5. A method according to claim 3 in which the aliphatic radicals contain 16–18 carbon atoms.

6. As a paint remover, a composition consisting essentially of 50–98% by weight of a volatile hydrocarbon solvent boiling below about 500° F. having dissolved therein 2–50% of an ethylene oxide condensation product of a carbamate salt composition selected from the group consisting of aliphatic guanidinium N-aliphatic carbamates and mixtures thereof with aliphatic amine salts of N-aliphatic carbamic acids wherein the aliphatic radicals contain 4 to 18 carbon atoms, said condensation product containing about 1–25 mols of combined ethylene oxide for each mol of amine combined in said carbamate salt composition.

7. As a paint remover, a composition consisting essentially of 50–98% by weight of a volatile hydrocarbon solvent boiling below about 500° F. having dissolved therein 2–50% of an ethylene oxide condensation product of a mixture of 50–70 mol percent of an aliphatic substituted guanidinium N-aliphatic carbamate and 50–30 mol percent of an aliphatic amine N-aliphatic carbamate in which the aliphatic radicals contain about 12 to 18 carbon atoms, said condensation product containing about 3 to 10 mols of combined ethylene oxide for each mol of amine combined in said carbamate mixture.

8. A composition according to claim 7 in which the aliphatic radicals contain 16–18 carbon atoms.

References Cited in the file of this patent

UNITED STATES PATENTS

| | | |
|---|---|---|
| 2,388,082 | Roediger | Oct. 30, 1945 |
| 2,433,517 | Kuentzel | Dec. 30, 1947 |
| 2,574,510 | Thurston et al. | Nov. 13, 1951 |